Nov. 3, 1936.                A. E. ANDERSON                2,059,836
            AUTOMATIC RECLOSING CIRCUIT BREAKER SYSTEM
                      Original Filed Sept. 20, 1934
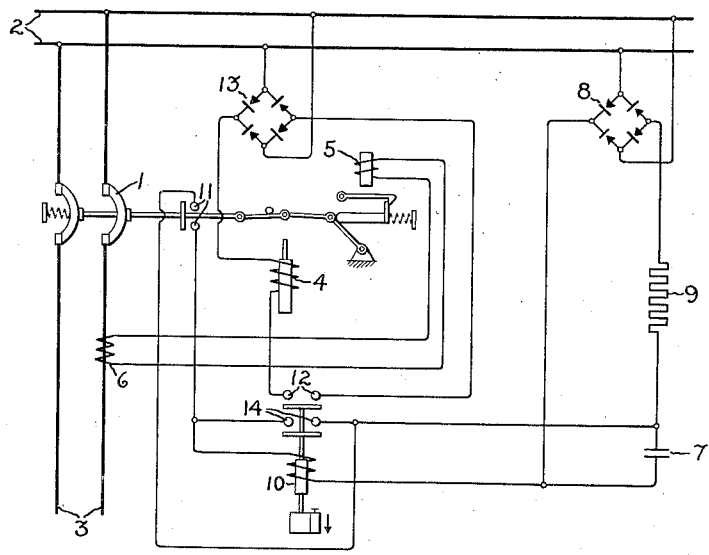
Inventor:
Arvid E. Anderson,
by Harry E. Dunham
His Attorney.

Patented Nov. 3, 1936

2,059,836

UNITED STATES PATENT OFFICE 2,059,836

AUTOMATIC RECLOSING CIRCUIT BREAKER SYSTEM

Arvid E. Anderson, Drexel Hill, Pa., assignor to General Electric Company, a corporation of New York Application September 20, 1934, Serial No. 744,796
Renewed May 15, 1936

8 Claims. (Cl. 175—294)

My invention relates to automatic reclosing circuit breaker systems and its object is to provide an improved arrangement for effecting a substantially instantaneous reclosure of a circuit breaker after the first opening thereof and for preventing another substantially instantaneous reclosure of the circuit breaker if it fails to remain closed for a predetermined time after the first reclosure.

In accordance with the preferred embodiment of my invention, I provide an arrangement whereby the opening of the circuit breaker causes a charged condenser to discharge through a suitable electro-responsive device, which in turn effects the closing of the circuit breaker, if the condenser has been sufficiently charged, and whereby the condenser can not be recharged to a value sufficient to effect the operation of the electro-responsive device until the circuit breaker has remained in its closed position for a predetermined length of time.

My invention will be better understood from the following description when taken in connection with the accompanying drawing, the single figure of which diagrammatically illustrates an automatic reclosing circuit breaker system embodying one embodiment of my invention, and its scope will be pointed out in the appended claims.

Referring to the drawing, I represents a circuit breaker which connects an alternating current supply circuit 2 to an alternating current load circuit 3. The circuit breaker I may be of any suitable type, examples of which are well known in the art. As shown in the drawing, it is a latched-in circuit breaker of the well-known trip-free type comprising a closing coil 4 and a trip coil 5 whereby a pretermined energization of the trip coil 5 while the closing coil 4 is still energized permits the circuit breaker to open and the circuit breaker is prevented from being closed again until the closing coil has first been de-energized.

Any suitable fault responsive means may be employed for effecting the opening of the circuit breaker I when a fault occurs on the load circuit 3. For accomplishing this result I have shown the trip coil 5 as being connected in series relation with the load circuit 3 by means of a current transformer 6. The trip coil 5 is arranged so that it is not sufficiently energized to effect the opening of the circuit breaker I until a predetermined abnormal current flows through the load circuit 3.

In order to effect a substantially instantaneous reclosure of the circuit breaker I when it is opened, I provide, in accordance with my invention, a condenser 7 which is connected to a suitable source of direct current so that it is normally charged. As shown in the drawing, the source of direct current is a full wave rectifier 8 which is interposed between the alternating current supply circuit 2 and the condenser 7. Also in series with the condenser 7 I have shown a relatively high resistance 9 which is so designed that it permits the condenser to be charged at a desired rate. I also provide a suitable electro-responsive device, such as a relay 10, which is so connected that when the circuit breaker I opens, the relay responds to the voltage across the charged condenser 7 and effects both the closing of the circuit breaker I and the discharge of the condenser 7. In the particular arrangement shown, these results are obtained by having the auxiliary contacts 11 on the circuit breaker I, when it is open, connect the operating winding of the relay 10 across the condenser 7 so that the relay 10 is energized by the voltage across the condenser 7. The condenser 7 then discharges through the relay winding at a rate dependent upon the constants of the relay circuit. The relay 10, by closing its contacts 12, completes an energizing circuit for the closing coil 4 of the circuit breaker I across a suitable source of direct current which is shown as a full wave rectifier 13 interposed between the alternating current supply circuit 2 and the closing coil 4. The relay 10, by closing its contacts 14, also maintains a locking circuit for its operating winding, which is independent of the auxliary contacts 11 on the circuit breaker I so as to insure that the condenser 7 is sufficiently discharged before the relay 10 opens its contacts 12 and 14.

The operation of the arrangement shown in the drawing is as follows: When the circuit breaker I is closed the condenser 7 is charged at a rate dependent upon the size of the resistance 9 and the capacity of the condenser 7. After the circuit breaker I has remained closed for a predetermined time, the condenser 7 becomes fully charged so that the voltage across its terminals is substantially equal to the voltage of the charging source 8.

It will now be assumed that after the condenser 7 has become fully charged, a fault occurs on the load circuit 3 which causes sufficient current to flow through the trip coil 5 to effect the opening of the circuit breaker I. By closing its auxiliary contacts 11, the circuit breaker I connects the operating winding of the relay 10 across the terminals of the condenser 7 so that the condenser starts to discharge through the relay winding. The time it takes the condenser to discharge depends upon the constants of the circuit through the relay winding. The voltage across the condenser 7 at the instant the relay winding is connected in parallel with it is sufficient to cause the relay 10 to close its contacts 12 and 14. By closing its contacts 14 the relay 10 completes a locking circuit for itself which is independent of the auxiliary contacts 11 on the circuit breaker 1. This locking circuit insures that the condenser 7 continues to discharge until its terminal voltage is below the value at which the relay 10 responds. The impedance of the winding of relay 10 is made low relatively to the impedance of the resistance 9 so that sufficient current from the rectifier 8 does not flow through the relay winding to maintain the relay in its energized position after the charge of the condenser 7 has decreased below the desired predetermined value.

By closing its contacts 12 the relay 10 connects the closing coil 4 of the circuit breaker 1 across the full wave rectifier 13 to effect a substantially instantaneous reclosure of the circuit breaker 1. By opening its auxiliary contacts 11 the circuit breaker 1 opens the original energizing circuit for the relay 10.

If the circuit breaker 1 remains closed after it is reclosed, the relay 10 opens its contacts 12 and 14 as soon as the charge on the condenser 7 has decreased below a predetermined value and the time delay resetting operation of relay 10 has been completed. By opening its contacts 14 relay 10 removes the relatively low impedance shunt from across the terminals of the condenser 7 so that the condenser will start to recharge and if the circuit breaker 1 remains closed long enough it will become fully charged again.

If, however, the circuit breaker 1 opens before the condenser 7 has had time enough to be recharged to a value sufficient to effect the operation of the relay 10, another reclosure of the circuit breaker cannot take place when the circuit breaker opens because the closing of the auxiliary contacts 11 reconnects the low impedance winding of the relay 10 across condenser 7 and thereby causes the condenser 7 to discharge without effecting the operation of the relay 10. The impedance of the coil of relay 10 is relatively low, as compared with the impedance of condenser 7, so that the condenser 7 is not charged to the operating value after the circuit breaker 1 opens under the conditions described above.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an electric circuit, a circuit breaker in said circuit, fault responsive means for effecting the opening of said circuit breaker, a charge condenser, a relay, means responsive to the opening of said circuit breaker for discharging said condenser through said relay, and means responsive to the energization of said relay for closing said circuit breaker.

2. In combination, an electric circuit, a circuit breaker in said circuit, fault responsive means for effecting the opening of said circuit breaker, a charge condenser, a relay, means responsive to the opening of said circuit breaker for connecting said relay in parallel with said condenser, and means controlled by said relay for closing said circuit breaker.

3. In combination, an electric circuit, a circuit breaker in said circuit, fault responsive means for effecting the opening of said circuit breaker, a charged condenser, voltage responsive means for effecting the closing of said circuit breaker, and means responsive to the opening of said circuit breaker for applying to said voltage responsive means the voltage across said charged condenser.

4. In combination, an electric circuit, a circuit breaker in said circuit, fault responsive means for effecting the opening of said circuit breaker, and means for effecting an instantaneous reclosure of said circuit breaker including a condenser, a source of direct current connected to said condenser, a relatively high resistance in series with said source and condenser, a relay having a relative low resistance operating winding, means responsive to the opening of said circuit breaker for connecting said relay winding in parallel with said condenser, and means controlled by said relay for closing said circuit breaker.

5. In combination, an electric circuit, a circuit breaker in said circuit, fault responsive means for effecting the opening of said circuit breaker, and means for effecting an instantaneous reclosure of said circuit breaker including a condenser, a source of direct current connected to said condenser, a relatively high resistance in series with said source and condenser, a relay having a relative low resistance operating winding, means responsive to the opening of said circuit breaker for connecting said relay winding in parallel with said condenser, and means controlled by said relay for closing said circuit breaker.

6. In combination, an electric circuit, a circuit breaker in said circuit, fault responsive means for effecting the opening of said circuit breaker and means for effecting an instantaneous reclosure of said circuit breaker including a condenser, means for charging said condenser, voltage responsive means for effecting the closing of said circuit breaker, means responsive to the opening of said circuit breaker for applying to said voltage responsive means the voltage across said charged condenser, and means for preventing said condenser for being recharged sufficiently to effect the operation of said voltage responsive means when said circuit breaker opens within a predetermined time interval after it is reclosed.

7. In combination, an electric circuit, a circuit breaker in said circuit, fault responsive means for effecting the opening of said circuit breaker and means for effecting an instantaneous reclosure of said circuit breaker including an electroresponsive device, means responsive to the energization of said device for closing said circuit breaker, a source of electric energy of sufficient capacity to effect only a single energization of said electroresponsive device and means responsive to the opening of said circuit breaker for connecting said source to said electroresponsive device.

8. In combination, an electric circuit, a circuit breaker in said circuit, fault-responsive means for effecting the opening of said circuit breaker and means for effecting an instantaneous reclosure of said circuit breaker including an electroresponsive device, means responsive to the energization of said device for closing said circuit breaker, a source of electric energy of sufficient capacity to effect only the single energization of said electroresponsive device, means responsive to the opening of said circuit breaker for connecting said source to said electroresponsive device, and means for restoring said source to a condition to effect another energization of said electroresponsive device in case said circuit breaker remains closed for a predetermined time.

ARVID E. ANDERSON.